United States Patent [19]
Cyrenne

[11] 3,960,992
[45] June 1, 1976

[54] COMBINATION FLUE GAS SCRUBBER AND HEAT EXCHANGER UNIT

[76] Inventor: Henri-Paul Cyrenne, 34, Boulevard de l'Artisan, Victoriaville, Quebec, Canada

[22] Filed: Aug. 22, 1974

[21] Appl. No.: 499,526

[52] U.S. Cl. ............................. 261/152; 55/222; 55/223; 55/257 R; 165/119; 261/DIG. 9
[51] Int. Cl.² .................. B01D 47/06; B01F 3/04
[58] Field of Search ................. 261/17, 118, 119 R, 261/152, 153, DIG. 9, 5, 6, 155, 156; 55/222, 227, 228, 223, 268, 269, DIG. 27, DIG. 36, 257 R; 126/113; 165/119, 60; 98/115 SB

[56] References Cited
UNITED STATES PATENTS

| | | | |
|---|---|---|---|
| 1,910,199 | 5/1933 | Brady | 261/153 |
| 2,052,969 | 9/1936 | Edwards | 55/222 X |
| 2,139,429 | 12/1938 | Wilson | 126/113 |
| 2,143,269 | 1/1939 | Hubbard | 126/113 X |
| 2,343,542 | 3/1944 | Faunce | 165/110 X |
| 2,522,086 | 9/1950 | Berlowitz | 165/60 X |
| 2,729,301 | 1/1956 | Ekstrom, Jr. | 261/DIG. 9 |
| 2,767,806 | 10/1956 | Blake | 55/223 |
| 2,825,210 | 3/1958 | Carr | 261/153 X |
| 2,940,733 | 6/1960 | Umbricht | 55/222 X |
| 3,168,030 | 2/1965 | Wilhelmsson et al. | 261/119 R X |
| 3,499,734 | 3/1970 | Newman et al. | 261/153 X |
| 3,525,505 | 8/1970 | Roberg | 261/DIG. 9 |
| 3,526,082 | 9/1970 | Thuillier | 261/DIG. 9 |
| 3,833,205 | 9/1974 | McAnespie | 261/153 X |
| 3,899,023 | 8/1975 | Zander et al. | 55/269 X |

*Primary Examiner*—Tim R. Miles
*Assistant Examiner*—Richard L. Chiesa

[57] ABSTRACT

Combination unit capable of use as a heat exchanger as well as for scrubbing particle-laden flue gases from a boiler, for instance. It comprises a casing inwardly divided into a lower chamber and an upper chamber, both chambers communicating by lateral baffled passages in which baffle members are disposed and water sprinklers are provided in such a manner as to create, in such lateral passages, a series of curtains of water through which the flue gases must pass in their way from the flue gas inlet, in the lower chamber, to the flue gas outlet, in the upper chamber. Simultaneously, banks of air conduits are provided in both chambers to recuperate heat from the hot flue gases. Water dripping from the aforesaid curtains is collected in the bottom of the casing and recirculated by the sprinklers after, occasionaly, having been filtered.

7 Claims, 3 Drawing Figures

COMBINATION FLUE GAS SCRUBBER AND HEAT EXCHANGER UNIT

The present invention relates to a device for depolluting atmospheric air and for use as a fuel economizer.

More specially, the invention is a combination flue gas scrubber and heat exchanger unit making use of hot, particle-laden, flue gases to preheat cool air. It also cleans the flue gases, particularly removing from them incandescent particles thereby reducing fire hazards and air pollution.

The heat exchanger and flue gas scrubber unit of the invention is of particular interest in sawmill operations as well as wood shops, welding shops or where large quantities of saw dust, wood chips and the like are neatly conveyed by pneumatic ducts into the boiler room where they are consumed by specially adapted burners. The resulting flue gases carry a considerable amount of inflamed cinders or polluted gases that are discharged into the atmosphere not only polluting it but also constituting a continuous fire hazard to surrounding properties. The heat exchanger and flue gas scrubber unit of the invention proposes to reduce such dangers to an appreciable degree.

It also intends to make use of the heat contained in the flue gases to heat fresh air for circulation in the sawmill building to heat it as it is known that such building is not easily heated because of the continuous movement of logs and timbers in and out of the building and also because of its particular construction.

It is the further purpose of the present invention to provide a heat exchanger which is compact, simple to construct and operate, and is efficient in operation. The heat exchanger is particularly efficient in cleaning the flue gases, employing a series of water curtains in a somewhat tortuous path followed by the flue gases in passing through the heat exchanger. Suitable means are provided for easily cleaning the dirty water so as to maintain a high cleaning efficiency in the heat exchanger.

The invention is particularly directed toward a combination flue gas scrubber and heat exchanger unit comprising: an inner closed casing having a flue gas inlet end wall and a flue gas outlet end wall spaced from one another; side walls between the end walls; a top wall joining the side and end walls and a bottom wall shaped as a water collecting basin and joining the side and end walls; chamber defining means in the casing provided by lateral walls extending fully between the end walls in inwardly spaced relationship with the casing side walls and terminating short of the top and bottom walls to define flue gas lateral passages communicating, at the lower ends thereof, with the water collecting basin; an upper wall over and joining the said lateral walls and end walls to define an upper chamber in communication with the upper ends of the lateral passages and an open-bottom inner chamber in communication with the water collecting basin and the lower ends of the lateral passages; flue gas inlet means at the flue gas inlet end wall feeding hot flue gases into the inner chamber and flue gas outlet means at the flue gas outlet wall drawing cooled gases out of the upper chamber; baffle members mounted in succession in the lateral passages to force the flue gases to follow a tortuous path between the lower and the upper chambers, each baffle member having a free outer edge overlapping the outer edges of adjacent baffle members; water sprinkling means mounted, in each lateral passage, on the upper one of the successive baffle members therein beneath the outer edge thereof sprinkling water over the outer edges of the succeeding baffle members whereby to form water curtains in the passages for the scrubbing of the flue gases, the water from the curtains dripping into the water collecting basin; water feed means joining the basin and the sprinkling means to supply water to the said sprinkling means, and air conduit means including air conduits extending across the lower and the upper chambers for heat exchange between air flowing therethrough and flue gases passing through the chambers and around the conduits.

An embodiment of the invention will now be described in detail, having reference to the accompanying drawings in which.

Figure 1:
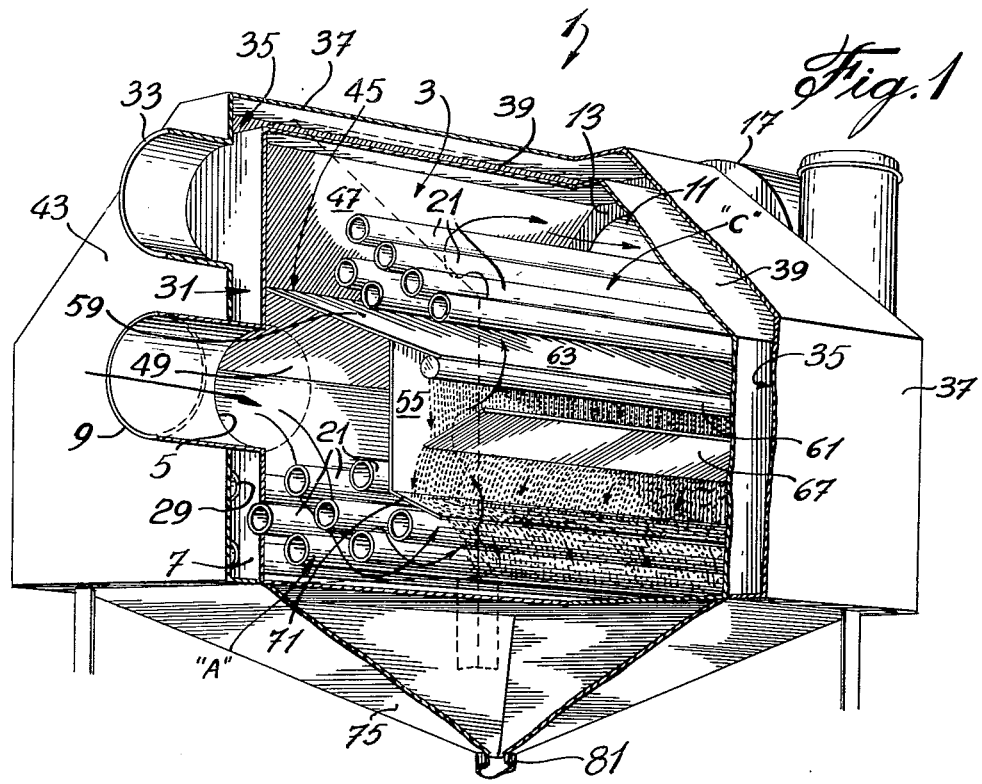
FIG. 1 is a perspective view of a unit made according to the teaching of the present invention, in partial cross-section.
Figure 2:
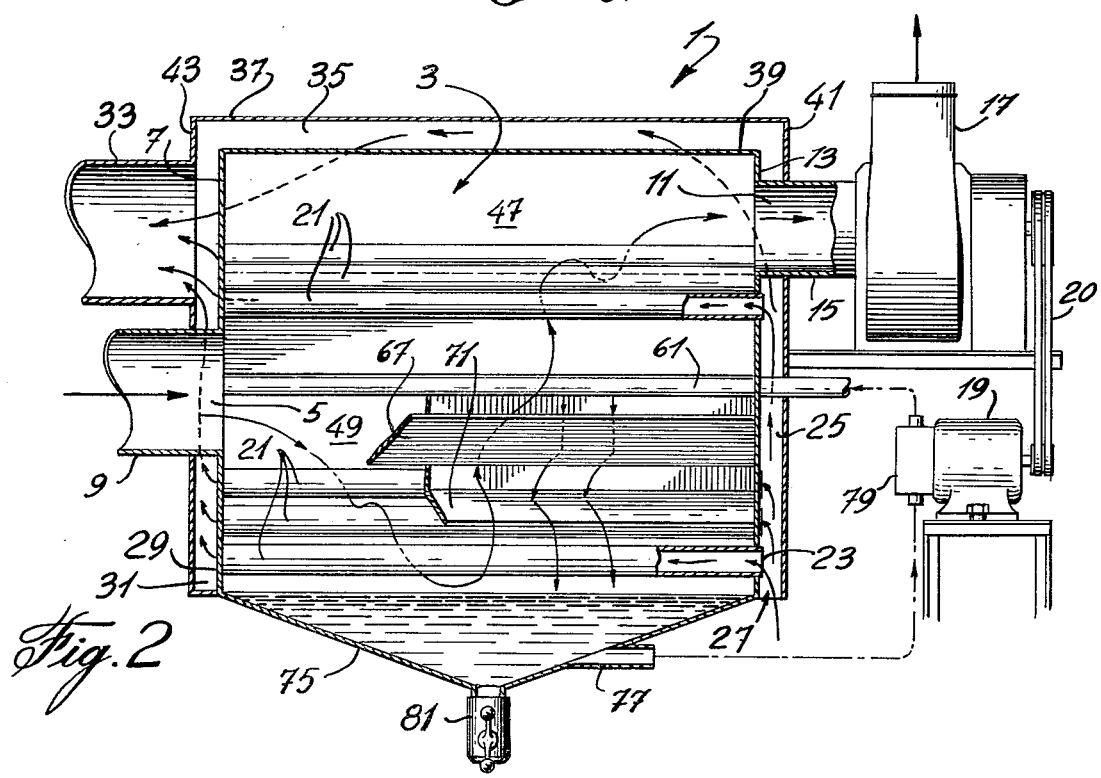
FIG. 2 is a longitudinal cross-sectional view of the unit.

The shown flue gas scrubber and heat exchanger unit 1 has an inner closed casing 3 having a flue gas inlet opening 5 in one substantially vertical end wall 7 to which a flue gas inlet duct 9 is connected. A flue gas outlet opening 11 is located in the upper part of the opposite end wall 13 of the casing. An outlet duct 15, connected to outlet 11, connects to an exhaust fan 17.

Fan 17 is operated by a motor 19 via a belt drive 20. Hot flue gas enters casing 3 through inlet 5 and is pulled through and out of casing 3, through outlet 11, by fan 17.

The hot flue gas is used to preheat cool fresh air. To this end, cool fresh air is passed through the casing 3 in heat exchange relation with the hot flue gas, flowing in banks of pipes 21 made of heat conducting material. As shown, the pipes 21 extend substantially horizontally between the two end walls 7, 13. One end 23 of the pipes 21 open into an inlet plenum chamber 25, outside the casing 3, but adjacent the end wall 13. Inlet chamber 25 has an inlet opening 27 through which cool fresh air enters. The other end 29 of pipes 21 open into an outlet plenum chamber 31 on the other side of casing 3 and adjacent end wall 5. Outlet chamber 31 connects to an outlet plenum duct 33 through which the fresh air, now heated by the exhaust gases, when passing through pipes 21, is withdrawn.

The inlet and outlet plenum chambers 25, 31 can be joined, if desired, outside casing 3 by a communication passage 35 extending about a substantial portion of the casing 3. Communication passage 35 is formed by a wall 37 spaced from the top 39 of casing 3 and inlet and outlet plenum chambers 25, 31 respectively are formed by end walls 41, 43 connected to wall 37 and spaced from end walls 13, 7 respectively.

Figure 3:
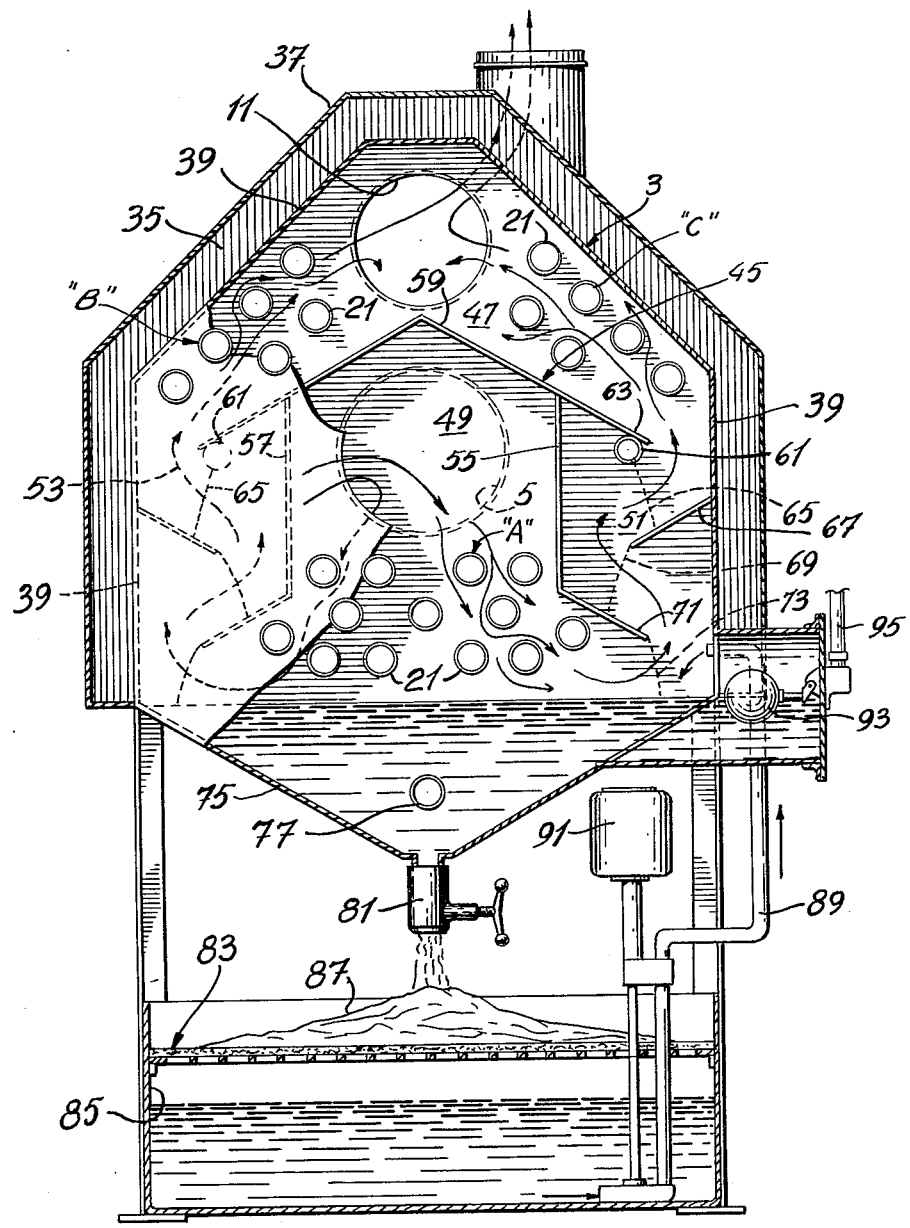
FIG. 3 is a transverse cross-sectional view of the unit.

In order to provide more efficient heat exchange capabilities, chamber defining means 45 are provided in the casing 3 preventing direct flue gas flow between inlet 5 and outlet 11. Instead, the flue gas must follow a somewhat tortuous path from inlet 5 past means 45 to outlet 11. The means 45 preferably comprises lateral and upper walls 55, 57, 59 extending between the end walls 7, 13 which walls divide casing 3 into an upper chamber 47 and a lower chamber 49 interconnected by lateral passages 51, 53. Chambers 47, 49 are joined by vertical lateral passages 51, 53 (FIG. 3) formed between the lateral walls 55, 57, and side wall 39 of casing 3. The lateral walls 55, 57 are joined at the top by the angular peaked upper wall 59.

The pipes or air conduits 21 are preferably arranged in three groups "A", "B", and "C" with group A in the lower chamber 49 and groups B and C in the upper chamber 47. The gas inlet 5 opens into the upper portion of lower chamber 49. Thus the hot flue gases enter lower chamber 49 first and flow down over the pipes 21 in group A heating the fresh air passing through these pipes. The flue gases then flow through passages 51, 53, over more pipes 21 in groups B and C to heat additional fresh air, and finally out outlet 11, located centrally between pipe groups B and C.

According to the invention, means are provided in the unit 1 for cleaning the hot flue gases as they pass through it. These cleaning means comprise scrubbing means for forming at least one fluid curtain through which the flue gases must pass in going through the casing 3. In the embodiment shown in the drawings, the scrubbing means are provided in both vertical passages 51, 53 laterally of the lower chamber 49. Since the scurbbing means in both passages 51, 53 are the same, only one will be described in detail.

The scrubbing means in each passage includes a perforated pipe 61 extending the length of the casing 3 between end walls 7, 13. Pipe 61 is preferably located near the top of the lateral passage and substantially in its center and attached to the bottom edge of an eave-type extension 63 of the peaked upper wall 59 which extension slopes downwardly into the passage (51, 53). The perforations in pipe 61 are arranged to direct a curtain 65 (FIG. 1) of water substantially downwardly in the passage. Extending into the passage from the side wall 39 of the casing 3 is a downwardly sloping first baffle 67 located below extension 63 and extending inwardly into the passage to a position beneath pipe 61. Water curtain 65 thus falls onto baffle 67 and then runs off its edge forming a second water curtain 69. A downwardly sloping second baffle 71 is provided in the passage below first baffle 67 and extending toward side wall 39 from vertical lateral wall 55. This baffle extends far enough into the passage to underlie first baffle 67, and receives second water curtain 69. This water then falls off the edge of second baffle 71 into the bottom of casing 3 forming a third water curtain 73. The hot flue gases can thus pass through three water curtains or screens 65, 69, 73 when passing from the lower chamber to the upper chamber thus thoroughly cleaning said flue gases.

The water from the scrubbing operation is collected in the bottom of the casing 3 shaped as a water collecting basin. From here, the collected water is recirculated through a line 77 to a pump 79, and from pump 79, operated by motor 19, back to the perforated pipes 61.

The water in the basin 75 can be periodically drained through a drain 81. The drained water can pass through suitable filtering means 83 into a tank 85 below basin 75. The impurities 87 scrubbed out of the exhaust gases are trapped by filtering means 83. The filtered water is pumped back from tank 85 into the basin 75 through line 89 by a recirculating pump 91.

A float valve 93, connected to a water inlet line 95, periodically opens line 95 to maintain a constant level of water in the basin 75.

It is thus seen that the unit 1 provides both efficient heat exchange in using the hot exhaust gases to preheat fresh air, and, at the same time, efficiently cleans the flue gases.

I claim:
1. A combination flue gas scrubber and heat exchanger unit comprising:
   a. an inner closed casing having a flue gas inlet end wall and a flue gas outlet end wall spaced from one another; side walls between said end walls; a top wall joining said side and end walls and a bottom wall shaped as a water collecting basin and joining said side and end walls;
   b. chamber defining means in said casing comprising: lateral walls extending fully between said end walls in inwardly spaced relationship with said casing side walls and terminating short of said top and bottom walls to define flue gas lateral passages communicating at the lower ends thereof with said water collecting basin; an upper wall over and joining said lateral walls and said end walls to define an upper chamber in communication with the upper ends of said lateral passages and an open-bottom inner chamber in communication with said water collecting basin and the lower ends of said lateral passages;
   c. flue gas inlet means at said flue gas inlet end wall feeding hot flue gases into said inner chamber and flue gas outlet means at said flue gas outlet wall drawing cooled flue gases out of said upper chamber;
   d. baffle members mounted in succession in said lateral passages to force said flue gases to follow a tortuous path between said lower and upper chambers, each baffle having a free outer edge overlapping the outer edges of adjacent baffle members;
   e. water sprinkling means mounted, in each lateral passage, on the upper one of said successive baffle members therein beneath the outer edge thereof sprinkling water over the outer edges of the succeeding baffle members whereby to form water curtains in said passages for the scrubbing of said flue gases, the water from said curtains dripping into said water collecting basin;
   f. water feed means joining said basin and said sprinkling means to supply water to said sprinkling means, and
   g. air conduit means including air conduits extending across said lower and upper chambers for heat exchange between air flowing therethrough and flue gases passing through said chambers and around said conduits.

2. A combination unit as claimed in claim 1, wherein said air conduits are grouped in banks with one bank located beneath said flue gas inlet means in said lower chamber and with a pair of banks located on either side of said flue gas outlet means in said upper chamber, said banks being thus disposed in the path of flue gases moving from said inlet to said outlet means.

3. A combination unit as claimed in claim 2, wherein said air conduit means comprises means defining with said casing end walls plenum chambers respectively for the intake and withdrawal of air to be heated by said flue gases.

4. A combination unit as claimed in claim 2, wherein said air conduit means comprises means defining with said casing end, side and top walls, plenum chambers respectively for the intake and withdrawal of air to be heated and communication passages along said top and side walls joining said plenum chambers.

5. A combination unit as claimed in claim 2, wherein said upper wall of said lower chamber is shaped as a peaked roof and said upper ones of said successive baffles are eaves-like extensions of said peaked roof.

6. A combination unit as claimed in claim 2, further comprising water filtering means for periodically purging water in said water collecting basin and filling said basin with filtered water.

7. A combination unit as claimed in claim 6, wherein said water filtering means comprises: a tank mounted beneath said water collecting basin; a draining device mounted at the bottom of said basin to drain water from said basin to said tank; a filter in said tank beneath said draining device and pump means to draw filtered water from said tank and including a pump and float valve means responsive to the level of water in said basin falling below a predetermined level to actuate said pump and feed filtered water in said basin to bring the water therein to said predetermined level.

* * * * *